Jan. 10, 1967   M. E. WOOD   3,296,731
SPINNING REEL
Original Filed Aug. 25, 1961   7 Sheets-Sheet 1
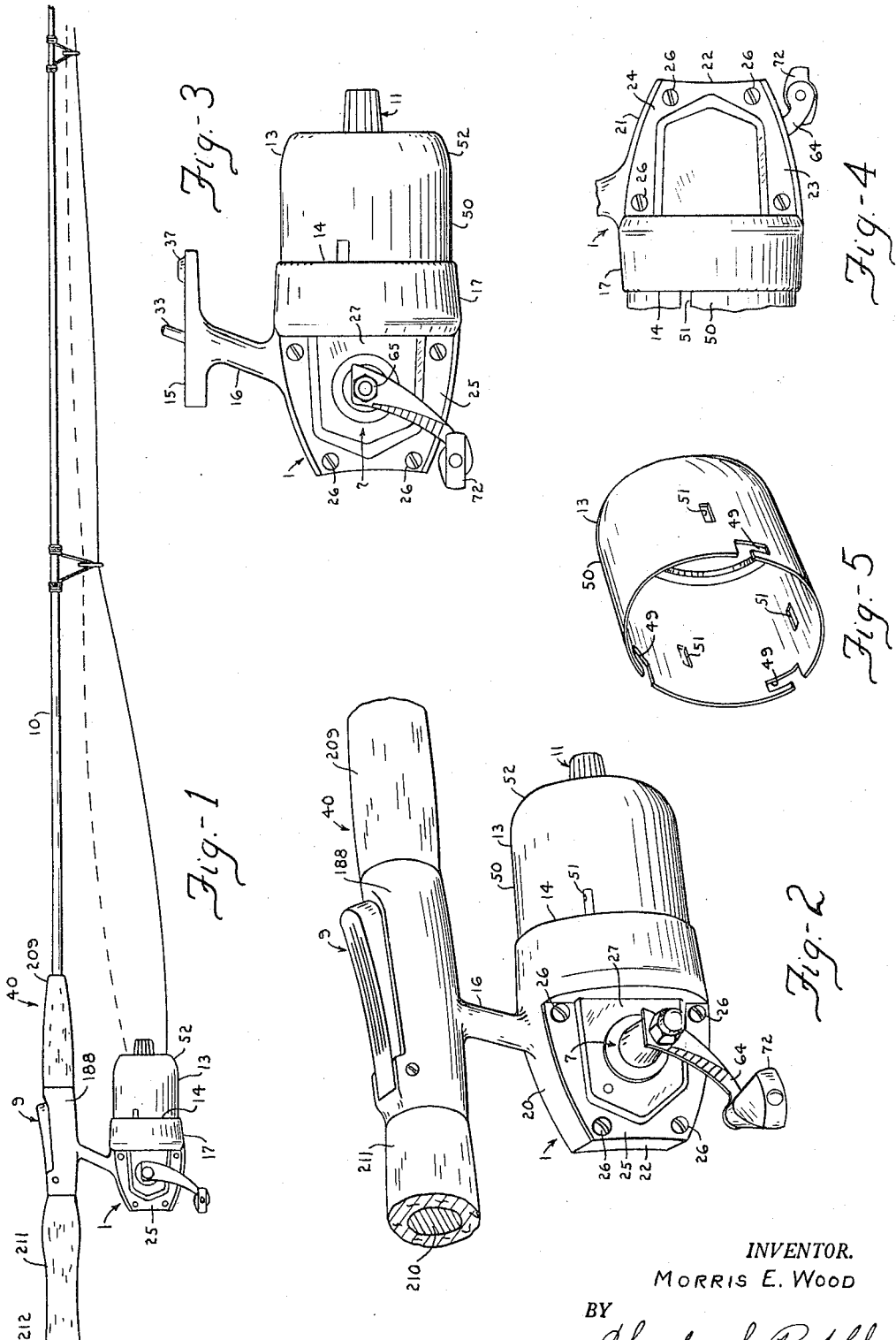
INVENTOR.
MORRIS E. WOOD
BY
Charles S. Penfold
ATTORNEY

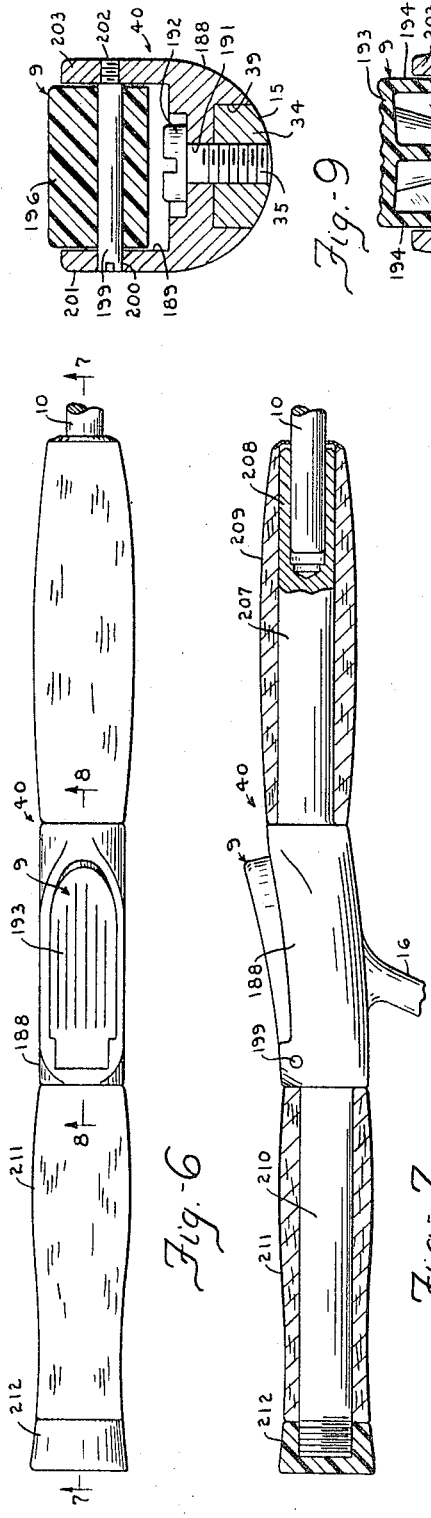

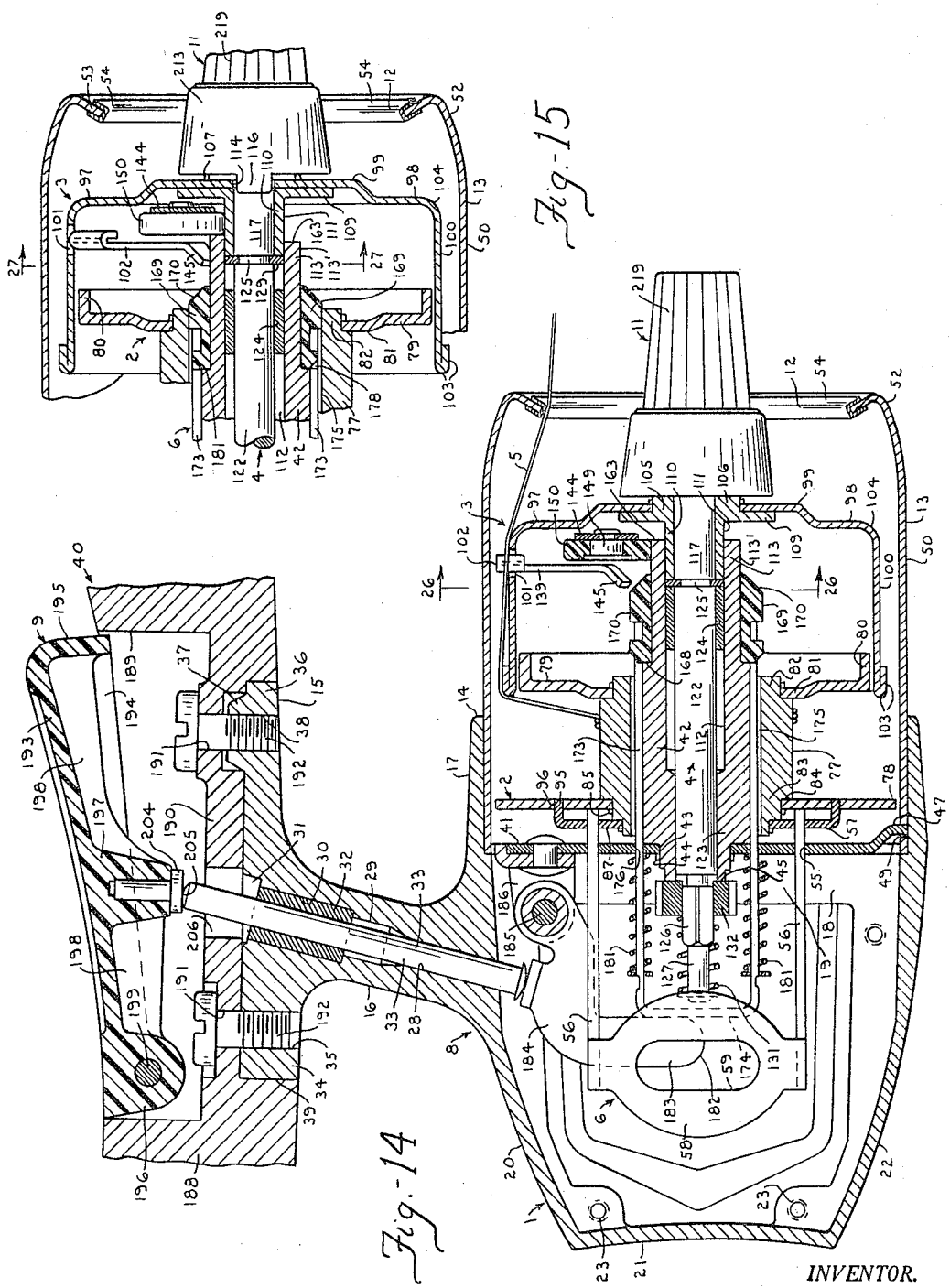

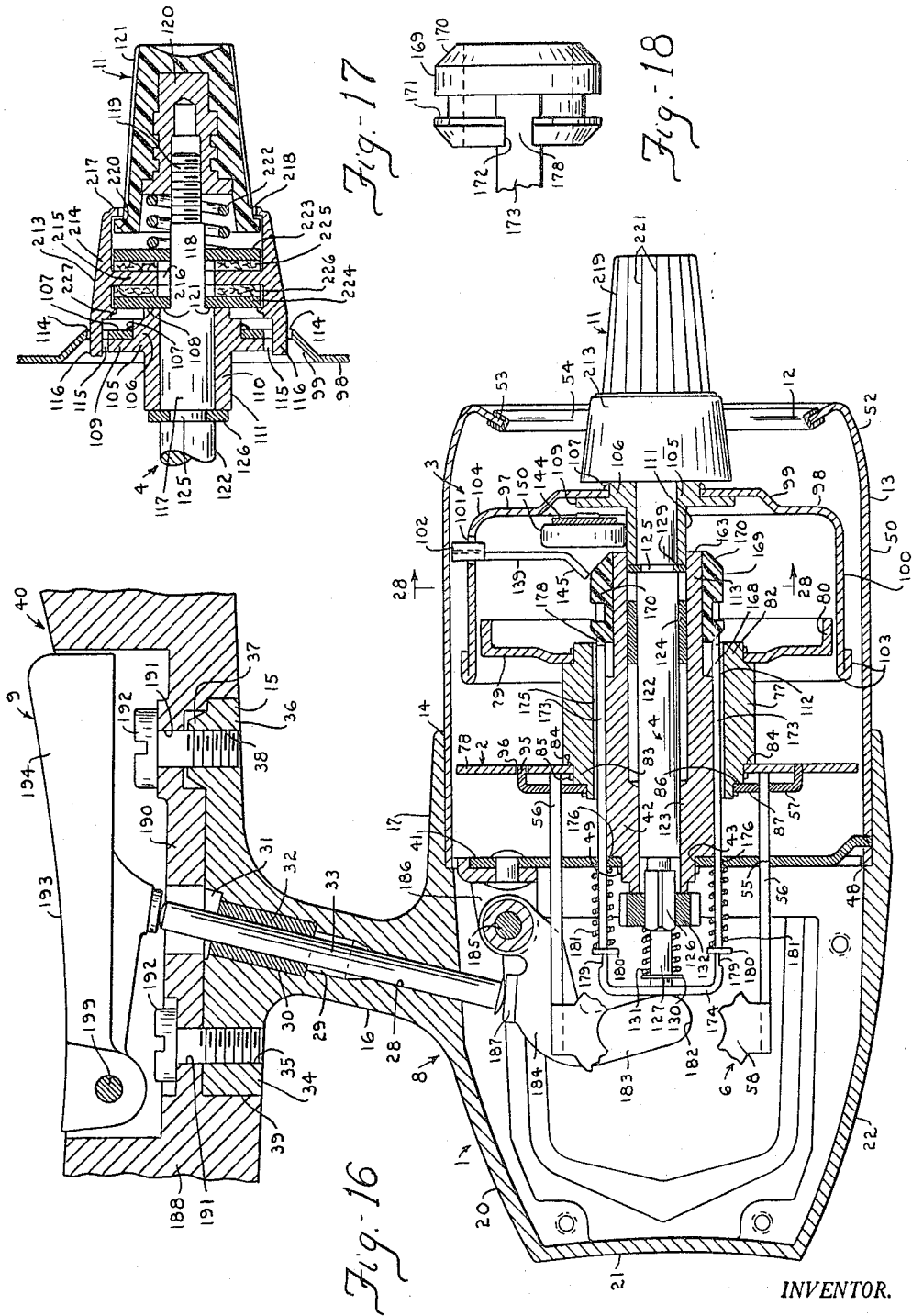

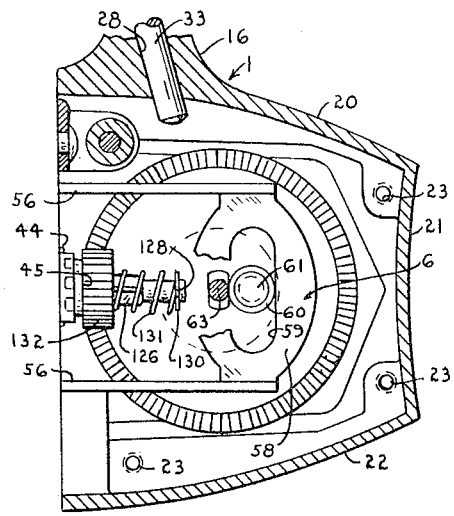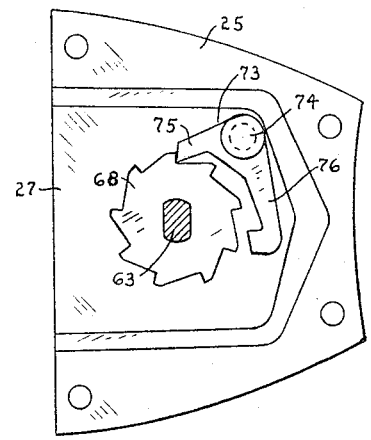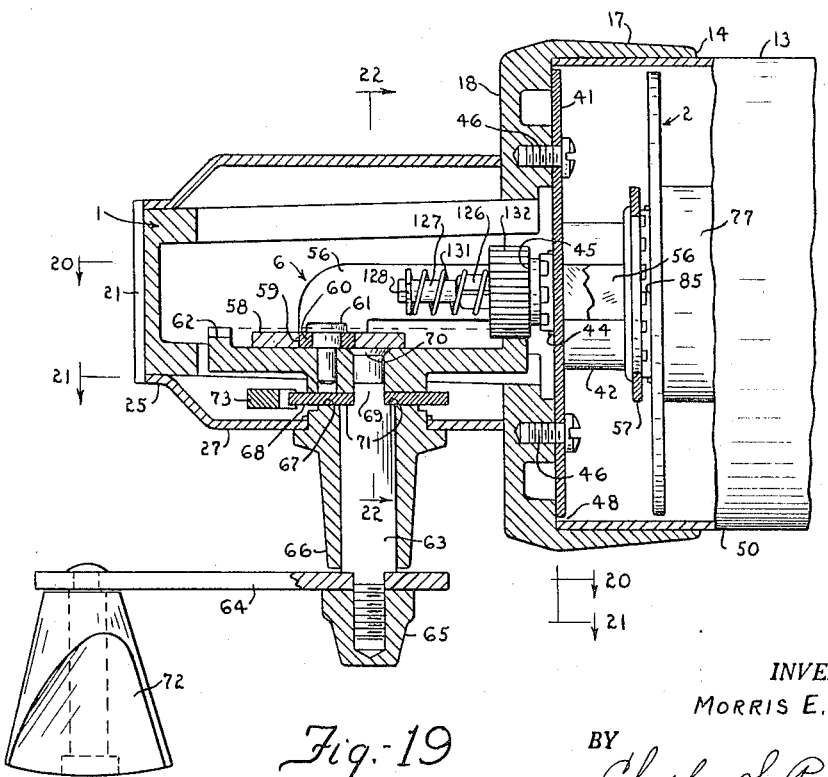

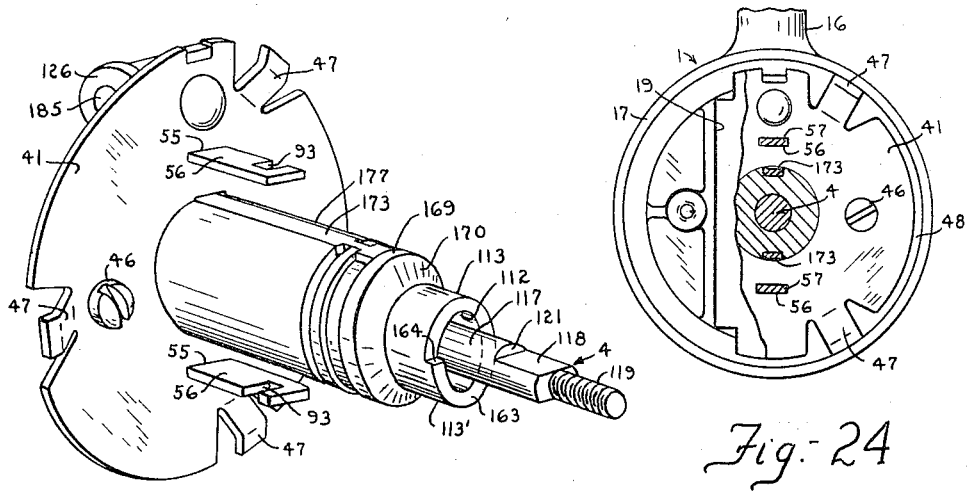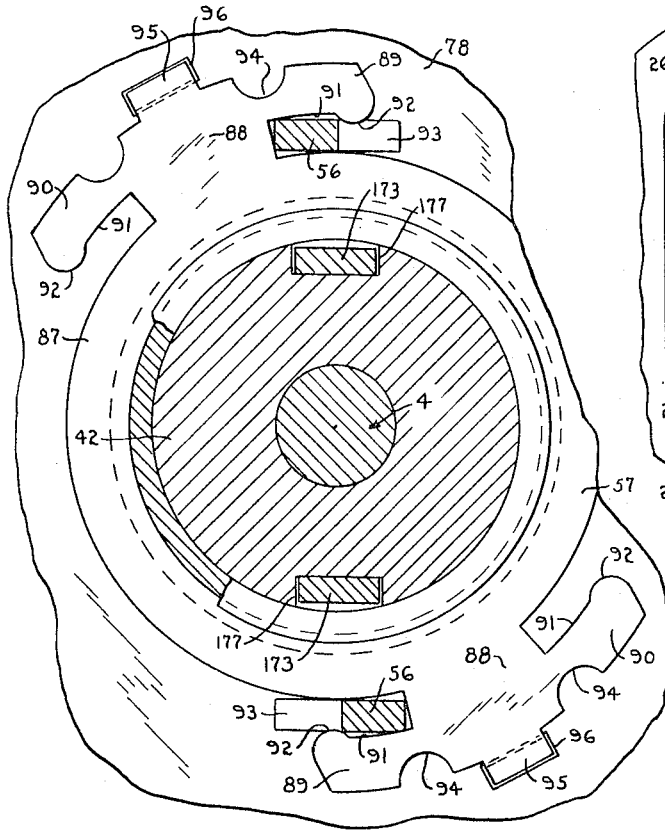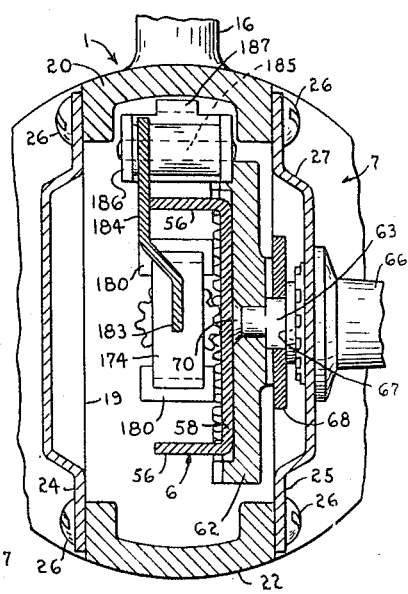

INVENTOR.
MORRIS E. WOOD
BY Charles A. Penfold
ATTORNEY

United States Patent Office 3,296,731
Patented Jan. 10, 1967

3,296,731
SPINNING REEL
Morris E. Wood, Bronson, Mich., assignor, by mesne assignments, to Bronson Specialties, Inc., Bronson, Mich., a corporation of Michigan
Continuation of application Ser. No. 133,907, Aug. 25, 1961. This application Jan. 6, 1964, Ser. No. 339,571
25 Claims. (Cl. 43—20)

This application is a continuation of my application Serial No. 133,907, filed August 25, 1961, now abandoned.

The subject invention relates generally to fishing reels and more particularly to a reel of the spinning type.

More particularly, an important object of the invention is to provide a line control assembly which preferably includes a drum or support adapted for rotation relative to a spool, a line engaging control element pivotally mounted on the drum, which serves the dual function of directing line onto the spool and in braking or stopping its flow therefrom, and a control member which is also pivotally mounted on the drum and engageable with the control element and various bearing surfaces on the reel to assist in positioning the control element.

Another object of the invention is to provide a reel comprised of various self-contained subassemblies or units embodying improved principles of design and construction and in which certain ones are operatively assembled and disassembled in unique ways.

A particular object of the invention is to provide an organization whereby line friction is substantially reduced, thereby providing a more powerful retrieve in relationship to any given drag setting.

A significant object of the invention is to provide a unique combination comprising a rod or pole and a reel provided with a line control and a cover having a relatively large opening therein for guiding a line, in which the distance between the longitudinal axes of the rod and reel, the distance between the opening in the cover and a line guide eye on the rod, and the relative diameters between the opening and line control are so related that any friction occurring between the margin of the material defining the opening and the line is materially reduced to a minimum to promote free flow of the line within the distance or area between the line control and guide eye.

Also, a very important object of the invention is to provide a reel having a tubular post or an extension, within the confines of which is mounted a reciprocable means or element which has one end operatively connected to a part of the reel mechanism and an opposite end adapted for disposition adjacent the rod for manual operation to actuate the said part.

A specific object of the invention is to provide an improved rod assembly comprising a body structure provided with a recess or chamber preferably located at the upper side of the rod and a tubular bearing extending downwardly from its underside for slidably receiving the reciprocable element, above referred to, with an actuator or control mounted for movement in the recess for imparting movement to said element. Otherwise expressed, provision is made on the rod for operating a part of the reel mechanism, as distinguished from utilizing a lever at the rear extremity of a reel of the closed face type which has a cover provided with an opening therein through which the line flows.

Another object of the invention is to provide a novel reel which is specifically designed and constructed for use with a particular rod or pole.

A further object of the invention is to provide a reel, which, among other things, includes a reciprocable spool, means for reciprocating the spool and improved means whereby the spool can be readily detachably connected to the reciprocating means.

A specific object of the invention is to provide a novel setup whereby the line control assembly can be readily shifted or operated through the agency of an actuator associated with the rod, as above referred to.

Another specific object of the invention is to provide a reel in which a cover therefor is provided with a line guide opening which is designed and constructed by an annular portion offering advantages with respect to line control and reduction in frictional resistance to line flow.

Other objects of the invention are to provide a structure which offers advantages with respect to ease of manipulation, efficiency, durability, balance, manufacture and assembly.

Many other objects and advantages of the invention or inventions embodied in the reel structure will become apparent after the description hereinafter set forth is considered in conjunction with the drawings annexed hereto.

In the drawings where a preferred form of the reel is exemplified:

FIGURE 1 is a side elevational view of a reel and rod assembly embodying the invention or inventions;

FIGURE 2 is a perspective view of the reel and a portion of the rod;

FIGURE 3 is a side elevational view of the reel detached from the rod;

FIGURE 4 is a partial elevational side view of the reel which is opposed to the side which carries a driving mechanism;

FIGURE 5 is a perspective view of a cover of the reel;

Figure 26:
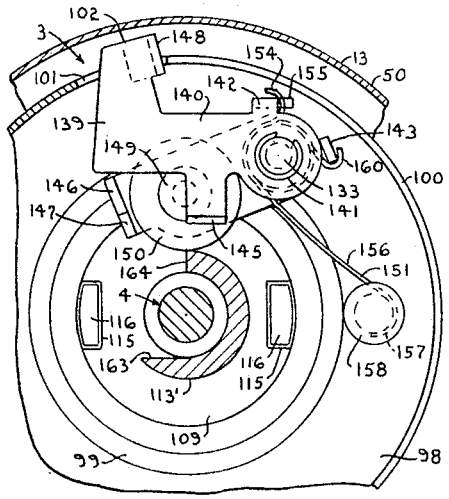
Figure 27:
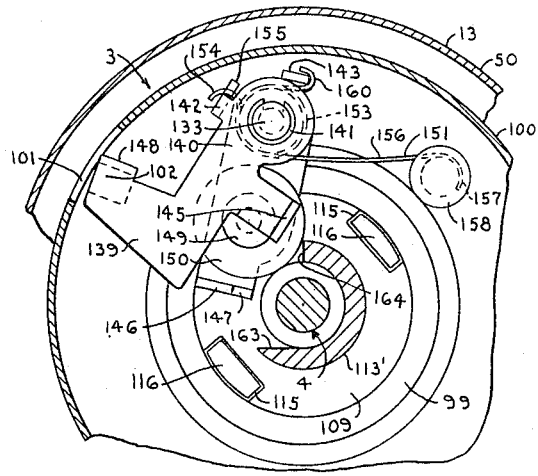
Figure 28:
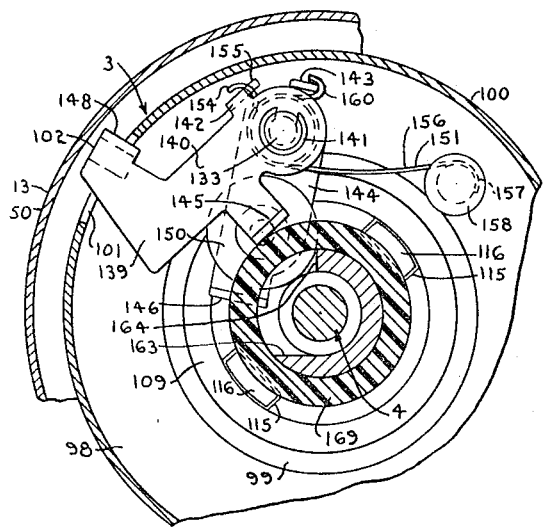
Figure 29:
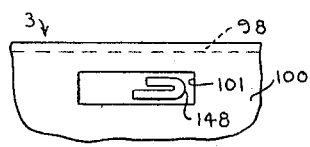
Figure 30:
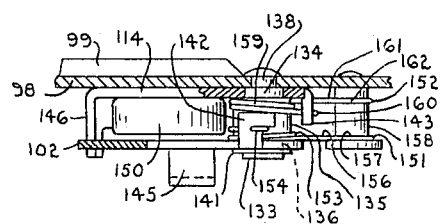
Figure 31:
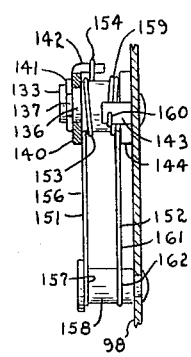

FIGURES 6 through 13 exemplify an actuator or lever, means for mounting the same on the handle of a rod or pole, means for providing an operative connection between the actuator and a part of the reel mechanism, and FIGURE 6 is a top view of the handle;

FIGURE 7 is a vertical section taken substantially on line 7—7 of FIGURE 6;

FIGURE 8 is an enlarged vertical section taken substantially on line 8—8 of FIGURE 6;

FIGURE 9 is a transverse section taken substantially on line 9—9 of FIGURE 8;

FIGURE 10 is a transverse section taken substantially on line 10—10 of FIGURE 8;

FIGURE 11 is a transverse section taken substantially on line 11—11 of FIGURE 8;

FIGURE 12 is a top view of structural details of a chamber provided in the rod handle for the actuator;

FIGURE 13 is a bottom view of structural details of a recess or seat provided in the rod handle for detachably receiving a reel attaching plate;

FIGURE 14 is an enlarged vertical sectional view of the reel and a portion of a rod showing the line control assembly in a line winding position;

FIGURE 15 is an enlarged partial vertical section showing the line control element in a retracted position whereby the line is free to unwind from the spool;

FIGURE 16 is an enlarged vertical sectional view showing the line control assembly shifted to a forward position to initiate a cast;

FIGURE 17 is a vertical section of a part of the reel illustrating a driven shaft and a drag assembly and a portion of a line control assembly operatively associated therewith;

FIGURE 18 is a view showing a mode of attaching a part of an actuating means with a cam, the latter of which is adapted to cooperate with a line control element;

FIGURE 19 is an enlarged partial horizontal section depicting structural details of the driving means and mounting unit for the driven shaft and spool;

FIGURE 20 is a partial vertical section of the reel, taken substantially on line 20—20 of FIGURE 19, depicting internal structure thereof;

FIGURE 21 is a partial vertical section taken substantially on line 21—21 of FIGURE 19 showing a detachable side member of the reel which carries the driving means and a ratchet mechanism therefor;

FIGURE 22 is a transverse section, taken substantially on line 22—22 of FIGURE 19, showing certain internal structure;

FIGURE 23 is a perspective view of a mounting unit for the drive shaft;

FIGURE 24 is a transverse section taken through the reel to show details with respect to attaching the mounting unit to the reel frame;

FIGURE 25 is an enlarged transverse vertical section showing a mode of detachably connecting the spool to the mounting unit and shifting means;

FIGURE 26 is a transverse section taken substantially on line 26—26 of FIGURE 14 showing the reel in a line winding position;

FIGURE 27 is a transverse section taken substantially on line 27—27 of FIGURE 15, depicting the line control element in a retracted position whereby the line may flow freely from the spool following the initial start of cast;

FIGURE 28 is a transverse section taken substantially on line 28—28 of FIGURE 16 showing components in a line braking or initial casting position;

FIGURE 29 is a side view of a portion of a drum constituting a component of the line control assembly, with an opening in the side wall of the drum through which the line control element may be projected;

FIGURE 30 is a transverse section showing a mode of operatively connecting components of the line control assembly; and FIGURE 31 is another transverse section illustrating structural details of the line control assembly.

Referring more particularly to FIGURES 1, 2, 14 and 19, the reel may be briefly described as comprising a frame generally designated 1, a reciprocably mounted spool 2, a line control assembly 3 mounted on a driven shaft 4 for controlling a line 5, actuating means 6 attached to the spool, driving means 7 operatively connected to the actuating means and to the driven shaft for simultaneously reciprocating the spool and rotating the shaft and control assembly as a unit, shiftable means 8, an actuator 9 carried by or mounted on a handle of a rod or pole 10 for manually operating the shiftable means to move the latter including the aforesaid unit forwardly, and a drag assembly 11 operatively connected to the control assembly and driven shaft and extending into a relatively large opening 12 provided in a cover 13 which affords a frictional driving connection between the control assembly and the shaft.

The reel frame 1 includes a cup formation 14 and an elongate attaching portion or plate 15 joined to the cup by a tubular post 16. The cup comprises an annular wall 17 and a vertical base wall structure 18 provided with a large vertical rectangular clearance opening 19. It may also be stated that the frame includes the wall structure 18 from which the annular wall 17 projects. The frame also comprises a rearwardly extending hollow formation defined by an upper or top integral inclined wall 20, a rear wall 21 disposed substantially parallel to the cup, and a lower inclined wall 22 which merges with the post 16 and base wall structure 18. The upper and lower walls 21 and 22 are provided with threaded apertures 23.

As evidenced in FIGURE 22, a pair of similar side plates 24 and 25 are respectively detachably secured against the sides of the hollow formation, above referred to, by screws 26 which extend through holes in the plates and connect with apertures 23. The plate 25 is provided with a hollow offset 27 which carries the driving means 7 in a manner to be described subsequently.

The post 16 of the reel frame is preferably angularly disposed with relation to the longitudinal axis of the cup 14 and attaching plate 15 and is made tubular by providing the same with an opening extending longitudinally therethrough. The opening is defined by a bore 28, counterbores 29, 30 and 31. A tubular bearing 32 is press fitted into the counterbore 30 and a cylindrical shaft or element 33 is reciprocably or slidably mounted in the bore 28 and bearing with the counterbores 29 and 31 providing clearance to reduce friction. The attaching portion or plate 15 of the reel frame is preferably square or rectangular in cross-section and includes a relatively thick extremity 34 provided with a threaded aperture 35 and a thinner and longer extremity 36 provided with a tapered boss 37, with a threaded aperture 38 extending therethrough. These extremities more or less form a tapered plate which nests or is received in an elongate recess provided in the underside of a handle generally designated 40 of the rod and merges or conforms therewith.

A mounting unit, shown in FIGURES 14, 19, 23 and 24, is connected to the frame for supporting the spool 2, driven shaft 4, shiftable means 8 for the line control assembly and the actuating means 6 connected to the driving means 7 for reciprocating the spool. This mounting preferably comprises an annular plate 41 and a relatively large tubular bearing 42 having an inner reduced end which is permanently secured in a central hole 43 provided therefor in the plate by upsetting as indicated at 44 and provided with an abutment 45. The plate 41 is detachably held in the cup 14 against the base wall structure 18 of the frame by a pair of diametrically disposed screws 46 which extend through the plate and connect with threaded holes provided therefor in such structure. The plate is also preferably formed with three identical integral resiliently flexible radially extending tongues 47 which are circumferentially spaced apart 120 degrees for engaging the inner periphery of the cup to assist in centering the position of the plate. The free ends of the tongues project beyond the periphery of the plate, which periphery is concentrically disposed in relation to the inner periphery of the cup to provide an annular space 48 as evidenced in FIGURE 14. The tongues are preferably curved or so shaped that they are resiliently detachably received in three bayonet slots 49 provided in a cylindrical wall 50 of the cover 13 as depicted in FIGURES 5 and 14. The cylindrical wall 50 is received in the cup in the annular space 48 about the plate. The wall 50 is also preferably provided with vent openings 51 to assist in air conditioning the interior of the reel to permit escape of water and promote line drying. The cover has a conical portion 52 and an inturned end wall 53 provided with the opening 12 defined by an annular edge which is embraced by a ring or guide 54 constructed of a suitable hardened material to reduce line wear. The structure of the cover embodies improved principles of design and construction which will be described more in detail subsequently.

The plate 41 is further provided with a pair of diametrically disposed square holes 55 which slidably guide a pair of slidable bars 56 of a follower having fore free ends which are detachably connected to a locking member 57 carried by the spool. The follower also includes an offset planar bridge or connecting portion 23 provided with a transverse slot 59 which slidably receives a roller 60 journalled on a stud 61 eccentrically fixed on the inner side of a drive gear 62 carried by a drive shaft 63 rotatable by a crank 64 connected thereto by a nut 65. The bridge 58 of the follower more or less bears against an inner planar face of the drive gear 62 to assist in stabilizing the movement of the follower. This follower primarily constitutes the actuating means 6 which, as stated above, operatively connects the driving means and the spool to effect smooth reciprocating motion to the latter while the line control assembly is rotating to level wind line onto the spool. The mode of attaching the rods to the spool will be described subsequently.

The hollow offset 27 of the side plate 25, as shown in FIGURE 19, carries a tubular bearing 66 in which the drive shaft 63 rotates. The bearing is provided with an inner reduced end which is permanently secured in a hole provided therefor in the offset 27 by upsetting as shown. This bearing is also provided with an inner flat end 67 which is engaged by a ratchet wheel 68 keyed to a squared portion 69 of the drive shaft. The portion 69 extends through an aperture therefor in the gear for keying the gear to the shaft and the latter is upset at 70 to permanently secure the gear against the wheel and the latter against shoulders 71 on the shaft. The crank 64 is preferably conventionally keyed to the shaft and a handle 72 is carried by the crank. A pawl 73 is pivotally mounted on a stud 74 fixed on the offset 27 of the side plate 25 and includes a relatively short arm 75 for selectively engaging teeth on the wheel and a longer arm 76 which is of a length and size and so located with relation to the other arm, stud and teeth that the upper arm of the pawl will selectively engage the teeth when the crank is turned in a clockwise direction. In other words, the arms cooperate with the teeth to permit turning of the drive shaft in a clockwise direction but not in a reverse direction. It will be noted that the ratchet wheel and pawl are substantially disposed within the confines of the hollow offset 27 of the plate 25.

The spool or line support 2, which will now be described, includes a hub 77 freely slidable on the bearing 42, a rear planar annular flange or side 78 and a front annular flange or side 79 somewhat smaller in diameter than the rear flange. The front flange, as depicted in FIGURE 16, is preferably provided with a forwardly extending annular rim or flange 80 and a central depression 81 having an opening therein through which a reduced portion 82 of the hub extends and is upset for permanently securing the flange thereto. The rear flange, as shown in FIGURES 16 and 25, is permanently held on a reduced portion 83 of the hub and against a shoulder 84 of the hub by upsetting at 85 and the locking member 57 is held against a shoulder 86 by rolling to locate an annular portion 87 of the member 57 in a predetermined axially spaced relation to the rear spool flange. This annular portion of the member is preferably provided with a pair of radially extending portions 88 and circumferentially extending portions or tongues 89 and 90 which are spaced from the annular portion to provide a pair of circumferentially spaced arcuate slots 91. Each of the tongues is provided with an inturned detent 92 for detachable reception in a notch or cooperating means 93 provided in each of the fore ends of the bars 56 of the follower. In other words, the spool is provided with means which is detachably connectible with means on the follower. More specifically, with this unique organization, after the cover and line control assembly are successively removed, the spool, which is held against rotation by the follower can be released therefrom by merely manually rotating it in a counterclockwise direction as viewed in FIGURE 25. It should be noted that the distance between the notches 93 and the fore ends of the bars 56 is substantially the same as the distance between the rear flange of the spool and the annular portion 87 of the member 57 so as to gauge and facilitate connecting the spool to the follower by merely rotating the former when the slots 91 are brought into registry with the notches 93. It will be noted that the tongues 89 and 90 are preferably notched at 94 to promote flexibility of the tongues and that the radial portions 88 are provided with forwardly extending projections 95 for reception in holes 96 in the rear flange of the spool for locating and keying purposes. Attention is directed to the fact that the front and rear flanges of the spool are preferably axially spaced apart a greater distance than the flanges of spools in some other reels of this type and that the diameter of the hub 77 is also somewhat larger, the purpose of which is to promote release of the line from the spool and provide a larger supporting area for the line. This arrangement also reduces the radial depth of coiled line and consequently assists in preventing line entanglements.

The line control assembly 3 illustrated in FIGURES 14, 15 and 17 and mode of attaching the same to the driven shaft 4 will now be described. This assembly is detachably connected to the driven shaft by the drag assembly 11 and preferably comprises a drum or cup 97 having a front or base wall 98, with a circular depression 99 therein and an annular or cylindrical side wall 100 provided with a circumferential slot or opening 101 through which a line control element 102, constituting an active component of the control assembly, may be projected. The rear free marginal edge portion of the side wall 100 is preferably folded back upon the outer surface of the wall to form smooth convex and planar line engaging surfaces 103 over which the line may travel to and from the spool in order to reduce line wear and space the line appreciably from the remaining outer peripheral surface of the wall between these engaging surfaces and a curved or convex surface 104 formed at the junction between the side and front walls.

A tubular fitting 105 is permanently fixed on the drum for movement therewith. This fitting, among other things, serves to stabilize motion of the drum on the driven shaft and has a portion 106 secured in an opening in the depression 99 by upsetting at 107 and is provided with an abutment 108. The fitting also includes a relatively large annular flange 109 seated in the depression and a rear cylindrical portion 110 having a peripheral bearing surface 111. The cylindrical portion is adapted to normally extend into a counterbore 112 provided in a forwardly extending reduced cylindrical extremity 113 of the bearing 42 when the control assembly 3 is in a retracted or line winding position as evidenced in FIGURE 14 or projected forwardly to the position shown in FIGURE 15. As depicted in FIGURES 15, 17 and 26, the depression 99 of the drum and the flange 109 of the fitting 105 are respectively provided with diametrically disposed aligned apertures 114 and 115 for detachably receiving a pair of axially extending projections 116 on the drag assembly 11, above referred to, the latter of which will be described more in detail subsequently.

The control assembly 3 is mounted on the driven shaft 4 for reciprocation therewith and for rotation therewith or for rotation relative thereto depending on the condition of the drag assembly. The driven shaft includes a relatively short cylindrical portion 117 disposed in the tubular fitting 105, a noncircular portion 118, located in advance of the portion 117, which is surrounded by components of the drag assembly 11, and a threaded end 119 which connects with a nut 120 of the assembly for attaching the latter to the shaft and holding the control assembly 3 thereon. A pair of shoulders or abutments 121 are formed on the shaft at the junction between the cylindrical and noncircular portions 117 and 118.

The driven shaft also includes an elongate cylindrical portion 122, somewhat longer than the portion 117, and is journalled in an inner portion 123 of the bearing 42 and in a bushing 124 of the oilless type secured in the counterbore 112 in the bearing in axially spaced relationship to the inner portion 123 to stabilize the motion of the shaft. The shaft further includes a neck portion 125 located between the cylindrical portions 117 and 122, a squared portion 126, and a rear end 127 provided with a reduced portion 128. An abutment, preferably in the form of a spring clip or washer 129, is detachably engaged with the neck 125 and is interposed between the bushing 124 and the inner end of the fitting 105. The bushing is adapted for engagement by the clip to limit rearward movement of the control assembly and shaft as a unit and locate the control assembly in a retracted normal line winding position. A similar clip or abutment 130 is detachably engaged with the reduced portion 128 for holding a helical spring 131 and a pinion gear 132 on the shaft. The squared portion 126 of the shaft is of a length to support the gear 132 for slidable but non-rotative movement relative to the shaft and the spring serves to normally press the gear against the abutment 45 on the inner end of the bearing 42 and in mesh with the drive gear 62 and urge the aforesaid unit rearwardly so that the clip engages the bushing to maintain the unit in the line winding position just referred to. The shaft 4 and control assembly 3 are adapted to be shifted forwardly as a unit by manipulating the actuator 9 on the rod handle 40 in a manner which will be later described.

Referring more in detail to the structure of the line control assembly 3, exemplified in FIGURES 14 and 26 through 31, the front wall 78 of the drum 97 is provided with a fixed rearwardly extending stud 133 which supports the line control element 102. This stud includes a cylindrical portion 134 engaging the rear side of the front wall 98 of the drum, an intermediate larger cylindrical portion 135, an adjacent cylindrical portion 136, similar to the portion 134, a reduced portion 137, and a reduced portion 138 which is secured in a hole provided therefor in the wall 98.

The line control element 102 preferably includes a pair of arms 139 and 140, disposed generally in a right angular relationship and in substantially the same plane, which plane is parallel to the plane of the front wall 98 of the drum. The free end of the arm 140 is provided with an aperture which receives the cylindrical portion 136 of the stud 133 for pivotally connecting the element thereto. A fastener or spring clip 141 engages the reduced portion 137 of the stud for detachably connecting the element thereto. The free end of the arm 140 is also provided with a forwardly extending lug 142 which is disposed in a predetermined spaced relation to a lug 143 provided on a control member or lever 144, also carried by the stud. The arm 140 of the line control element is provided with a rearwardly extending projection 146 located between the arms. The projection 146 is notched at 147 for clearance purposes. The free end of the arm 139 is preferably provided with an integral portion which is folded or turned over in parallel relation to the arm to form an elongate convex surface 148 for engaging the line when such arm is moved outwardly through the slot or opening 101 provided in the side wall 100 of the drum.

The control member or lever 144, as stated above, assists in controlling the operation of the line control element 102. This lever has an end provided with an aperture which receives the cylindrical portion 134 of the stud 133 to pivotally connect the lever thereto and due to the relative sizes of the portion 134 and the intermediate portion 135 of the stud, the lever is permanently connected to the stud. The lever carries a forwardly extending stud 149 on which is journalled a movable abutment, preferably in the form of a plastic roller or wheel 150. Attention is directed to the fact that the element 102 and the lever 144 are movable in planes substantially transverse to the longitudinal axis of the reel; that the roller is disposed between the element and lever; and that the rearward projection 146 of the lever is adapted to engage the element as shown in FIGURE 26 for urging the element outwardly to a line winding position when, for example, the roller is in engagement with a peripheral surface 113' of the reduced fore extremity 113 of the bearing 42. The rear finger 145 of the element 102 is adapted to engage a reciprocable cam member which will be described later. The roller may be constructed of a plastic, like nylon, or of any material suitable for the purpose. Also, it may be made of metal or in the form of a curved abutment, as distinguished from the roller shown, and its contacting surface can be treated with Teflon to reduce friction.

Resilient or biasing means, preferably in the form of a pair of similar springs 151 and 152, are utilized to respectively normally urge the line control element 102 and the control lever 144 in counterclockwise directions toward retracted positions when viewed as in FIGURES 26, 27 and 28. The spring 151 has a coil 153 which surrounds the intermediate portion 135 of the fixed stud 133, a hook 154 engaging a notch 155 in the lug 142 of the control element and an offset elongate portion 156 having an end 157 which embraces a rivet or abutment 158 secured to the wall 98 of the drum. With this organization the spring 151 provides an effective pressure against the lug 142 of the element to urge the latter in the counterclockwise direction previously mentioned and also urge the element against the projection 146 of the lever and thereby augment the urging of the spring 152 against such lever. The other spring 152 has a coil 159 surrounding the stud, a hook 160 engaging the lug 143 on the lever and an offset elongate portion 161 with an end 162 engaging the rivet 158 to urge the lever in the said counterclockwise direction. It will be noted that the elongate portions of both springs are located between the element and lever. With this unique setup, and as will be described hereinafter, the control element can be pivoted about the axis of the stud 133 independently of the lever to locate the line engaging surface 148 on the element outwardly through the slot 101 or to a retracted position within the confines of the drum and that the lever can also be pivoted about said axis which is parallel to the longitudinal axis of the reel. It will be further manifest that any movement of the lever clockwise or counterclockwise will simultaneously impart a corresponding movement to the control element. Although the control element may be biased by the spring 151 when the control assembly is in a certain posiiton, it is not essential that the element be biased to move it out of the path of the line at the beginning of a cast. In other words, this spring primarily serves to counterbalance the weight of the element and temporarily maintain it in whatever position it is moved or retracted by the line.

One or both of the springs 151 and 152 may be instrumental in urging the roller 150 against the peripheral surface 111 of the fitting 105 when the line control assembly 3 is removed from the reel or when the control assembly 3 is shifted forwardly by the shiftable means 8 through the agency of the actuator 9 as evidenced in FIGURE 14. When the assembly is in the normal line winding position as illustrated in FIGURE 14, the roller will rotate about the axis of the stud 149 and ride on the periphery 113' of the reduced portion 113 of the bearing 42 to maintain the arm 139 of the control element 102 extended through the slot 101 in the wall 100 of the control drum 97 so that the line engaging surface 148 of the element will engage the line 5 and direct it onto the spool 2. The reduced portion 113 of the bearing 42 is also preferably provided with an inclined cam surface 163 and an axial abutment 164. The surface 113' and inclined cam surface may be engaged by the roller for influencing movement of the lever to position the control element in a manner which will be explained more in detail subsequently.

The shiftable means 8 for moving the unit comprising the control assembly 3 and driven shaft 4 forwardly will now be described. The shiftable means may be designed and constructed in various ways but as depicted includes an annular cam member 169, preferably made of plastic, such as nylon, which is slidably mounted on the reduced fore extremity 113 of the bearing 42. This member is provided with a frontal conical cam surface 170 which is adapted to engage the finger 145 on the control element 102 when the member is moved manually forwardly by the actuator 9. The member 169 is provided with an annular groove 171 and diametrically disposed notches 172 intersecting the groove. A generally U-shaped member or yoke has a pair of yieldable parallel legs 173 and a connecting portion 174 joining the legs. The connecting portion is located at the rear of the mounting plate 41 and the legs extend forwardly through a center hole 175 in the hub 77 of the spool 2, through apertures 176 provided therefor in the plate 41 and into diametrically disposed longitudinally extending guideways or grooves 177 provided in the bearing 42, which grooves are aligned with said apertures. The legs are located substantially within the confines of the grooves and the free ends of the legs are preferably provided with reduced portions 178 which interconnect with the notches 172 and ends which can be nested in the groove 171 by spreading the legs. The yoke and cam are thus detachably connected for movement in unison. The legs adjacent the connecting portion are preferably deformed to provide abutments 179 which are engaged by washers 180 on the legs and helical springs 181 respectively surround the legs and bear against the washers and mounting plate to normally maintain the shiftable means in a fully retracted position limited by the cam member engaging an annular shoulder or abutment 168 on the bearing 42 to preferably locate the connecting portion 174 of the yoke in spaced relation to the rear end 127 of the driven shaft 4 as shown in FIGURE 14. The springs 181 also serve to more or less urge the portion 174 in relation to a rounded end 182 of a depending leg 183 of a pressure applying crank 184 pivotally mounted at 185 to a bracket 186 secured to the rear side of the plate 41 as shown in FIGURES 14, 16 and 22. The lever is provided with an offset 187 having a bearing surface thereon which is preferably normally engaged with a lower rounded end of the slidable element 33. It will be noted that the bridge 58 of the follower may not only engage the drive gear for guidance but also the crank 184 for the same purpose.

The actuator 9, clearly illustrated in FIGURES 6 through 11 and 14, for operating the yoke or shiftable means 8 through the agency of the slidable element 33 will now be described. The handle 40 for the rod 10 may be designed and constructed as desired but as depicted preferably includes a central curved moulded housing 188 which is provided with the lower recess or seat 39, above referred to, in which the plate 15 of the reel is detachably secured. The housing is also provided with an upper elongate chamber or recess 189 separated from the lower recess 39 by a partition or wall 190. The partition is provided with apertures 191 which respectively register with the threaded holes 35 and 38 in the plate so that screws 192, concealed by the actuator, can be inserted to secure the plate in the lower recess 39. The actuator is preferably in the form of a curved lever which generally conforms to the curvature of the housing. The actuator includes a top wall 193 which is curved across its width and length and provided with serrations or corrugations on its upper surface to facilitate pressure engagement of a thumb or finger thereto. The actuator also includes side walls 194, a forward end wall 195, a rear tubular end portion 196, and a boss 197 reinforced by internal webs 198. A screw 199 extends through a hole 200 in a wall 201 of the housing, the tubular end portion 196 and engages a threaded aperture 202 in an opposite and parallel wall 203 of the housing. The boss 197 is preferably provided with a hole which receives the shank of a member having a head 204 constituting an abutment for normally engaging an upper rounded end 205 of the slidable element 33 in a manner whereby manual pressure applied to the actuator will cause the element to move toward the reel to pivot the crank 184 to force the yoke carrying the cam 169 forwardly until the bridge 174 of the yoke engages the rear end of the driven shaft, whereupon the driven shaft is moved forwardly along the yoke to operate the reel in various respects which will be subsequently explained. The partition 190 is provided with a clearance opening 206, intermediate the apertures 191, which registers with the counter-recess 31 in the plate 15. It will be noted that at least portions of the side walls and the forward end wall of the actuator are always disposed in the upper chamber 189 whether the actuator is normally raised for operation or is fully depressed in order to assist in guiding the actuator and preventing entrance of foreign matter into the chamber.

The housing 188 of the handle structure is also preferably provided with a forwardly extending cylindrical extension 207 provided with a socket 208 for receiving the rod 10 and a handle grip 209 surrounding the extension. The housing is further provided with a rearwardly extending cylindrical extension 210 which carries a handle grip 211 secured thereto by a cap 212 threadedly connected to a threaded end of the extension. It will be noted that the longitudinal axes of the extension 207 and 210 are disposed in parallel relation with the housing curved therebetween. It is to be understood that if found desirable the element 33 could be made slightly longer so that its upper end or a knob thereon could be readily engaged by a digit of the hand, in which event, the actuator lever shown could be omitted.

The drag control assembly 11, as best shown in FIGURE 17, will now be described more in detail. It includes a housing 213 provided with the projections 116, alluded to above, which register with the apertures 114 and notches 115 in the depression 99 of the drum and flange 109 of the fitting 105 for keying the housing or assembly for rotation with the line control assembly 3. The housing has a tapered cylindrical side wall 214, an internal partition or radial wall 215 provided with an opening 216 receiving the noncircular portion 118 of the driven shaft, and an end wall 217 provided with an opening 218 in which a handle or knob 219 extends, with a radial flange 220 of the knob engaging an inner surface of the end wall 217. The knob is preferably tapered and provided with exterior longitudinally extending serrations or flutes 221 to facilitate turning of the knob on the driven shaft and relative to the housing. The nut 120 is preferably moulded or embedded in the knob for engaging the threaded end 119 of the driven shaft. This nut is disposed inwardly from the flange 220 to provide a space for receiving an outer end of a helical spring 222 which engages the nut. The spring surrounds the shaft and its inner end engages a friction member 223, preferably of metal, keyed to the noncircular portion 118 of the shaft and located forwardly of the partition 215 of the housing. A corresponding friction member 224 is also keyed to the noncircular portion of the shaft and located at the rear side of the partition 215 and engages the abutment 108 on the fitting 105 and the shoulders 121 on the shaft. A pair of identical friction elements 225 and 226, preferably of leather or equivalent material, are respectively interposed between the partition and the friction members 223 and 224 for frictionally engaging this wall and members, all for the purpose of providing a releasable friction driving connection between the control assembly 3 and the driven shaft. The friction member 224 and friction element 225 are preferably permanently held in the housing by upsetting a portion of its rim against the member 224 as indicated at 227, and the friction member 223, friction element 225 and spring 222 are preferably permanently held between the partition and knob in view of the relationship between the end wall 217 of the housing and flange 220 of the knob, which wall and flange also serve to preferably hold the housing and knob assembled. The spring 222 normally offers some clamping pressure and this pressure and others may be varied by manipulating the knob to cause the control assembly 3 to rotate with the shaft for winding the line onto the spool and also permit the assembly to reversely rotate relative to the shaft when the outward pulling force on the line exceeds the resistance offered by the drag assembly and the driven shaft and drive gear are held against reverse rotation through the agency of the ratchet mechanism. The use of a reversely rotatable line control assembly with a normally nonrotatable but reciprocating spool serves to prevent line twist and entanglement.

The drag assembly is readily removable from the driven shaft and since it is a self-contained unit, there are no loose or separate components which can be lost during assembly and disassembly of the reel. The guide opening in the cover affords ready access to the knob of the drag assembly and the size of the knob and opening are such that an annular space is provided through which the line travels.

Considering now the operation of the reel and referring particularly to FIGURES 14 and 26, rotation of the driving means will cause clockwise rotation of the line control assembly 3 to direct the line onto the spool while the latter is reciprocating to assist in level winding the line thereon. During the line winding operation, the outer end of the control element 102 is held in an extended position through the opening 101 in the drum to present its surfaces 148 for engagement with the line. The element is held in this position by the control lever 144 through its roller 150 engaging the peripheral surface 113' of the bearing 42 and an edge of its projection 146 engaging an edge of the control element. The spring 152 serves to urge the roller against the said peripheral surface and the spring 151 urges the element against the projection 146. The roller materially reduces the friction against the bearing caused by the load imposed by the line and the notch 147 in the projection reduces friction between the projection and bearing surface 113'.

To conduct a cast, the actuator 9 is depressed as shown in FIGURE 16 to move the cam member 169 forwardly to cause its cam surface 170 to engage the angled finger 145 of the control element and the connecting portion 174 of the yoke into engagement with the driven shaft 4 to move the latter and line control assembly 3 as a unit to a position whereby the roller 150 slips off the peripheral bearing surface 113' of the bearing 42 and flips back against the periphery 111 of the fitting 105 on the drum. During this forward shifting of the unit the control element 102 is held extended through the opening 101 to engage and prevent the line from unwinding from the spool. In other words, the cam member supports the control element in the extended position in lieu of the lever when the roller is in engagement with the periphery of the bearing. When the pressure being applied to the actuator is removed for the cast, the spring 131 on the driven shaft, which has previously been compressed by the forward movement of the unit, automatically moves the unit rearwardly until the roller engages the inclined cam surface 163 of the bearing 42 to stop or limit such movement and thereby maintain the unit in a predetermined forward position as evidenced in FIGURE 15. Also, removal of such pressure will cause the springs 181 on the yoke of the shiftable means 8, which were previously compressed due to the pressure, to automatically retract the shifting means to disengage the cam member 169 from the control element, whereupon the counterbalancing spring 151 will automatically return or retract the element to a position substantially within the confines of the drum and thereby free the line for the cast as illustrated in FIGURE 15.

When one desires to stop the outflow of the line at the end of or during a cast, the actuator may again be depressed to effect engagement between the surface 170 on the cam member and finger 145 on the control element to cam and pivot the latter to the extended position into the path of the line and thereby prevent the line from uncoiling from the spool.

To retrieve the line, the crank is turned to reciprocate the spool and rotate the unit clockwise as in FIGURES 26 and 27 to cause the roller to slide or roll on the inclined cam surface 163 of the bearing until it engages the abutment 164, which cams or pivots the roller outwardly and back onto the periphery 113' of the bearing, thereby causing the lever to pivot the control element into the path of the line, while allowing the unit to retract to its normal line winding position. Assuming there is a pull on the line, the organization has the advantage of permitting manual operation of the actuator 9 from the handle of the pole to move the free end of the control element outwardly through the opening in the drum for stopping or controlling the flow of the line from the spool, regardless of the point at which the roller is in engagement with the cam surface 163. The spacing between the rear end of the driven shaft and the connecting portion 174 of the yoke of the shiftable means 8 enables one to actuate the control element in the manner just described and so that the cam member will directly actuate and support the element. In other words, the control element can be operated independently of the unit when the unit is in its advanced forward position determined by the roller engaging the cam surface 163 or when the unit is manually held in any one of a plurality of other advanced positions by application of pressure to the actuator. It will also be manifest that the operation of the control element under such circumstances is independent of the control lever and that the control assembly can be rotated clockwise without operating this lever to locate the element in a line engaging position.

Attention is directed to the important fact that for maximum retrieve efficiency the opening in the cover should be not less than 80% to 100% of the diameter of the drum of the line control assembly.

In view of the foregoing, it will be manifest that the reel offers, among other things, a unique organization whereby the control element of the line control assembly serves the dual purpose of directing the line onto a spool as well as stop or retard release of the line from the spool. In other words, the element is so constructed and arranged with respect to other associated components that a separate braking structure comprised, for example, of a pair of relatively movable axially disposed parts are not required. At no time is the line clamped, pinched or caused to be pulled between surfaces which will deform, roughen, cut or otherwise shorten its life or usefulness.

Attention is particularly directed to the important fact that reverse rotation of the line control assembly relative to the driven shaft is continuously controlled by the adjustable drag assembly during all phases of reel operation, thereby providing a cushioned line control system which automatically provides a maximum safe load which can be placed on the line during the power swing of the cast, as well as stopping or snubbing the line during a cast. Otherwise expressed, when the drag is properly set for the tensile strength of the line being used, it is impossible to exceed the tensile strength of the line during any phase of the fishing operation.

Having thus described my invention, it is obvious that various modifications may be made in the same without departing from the spirit of the invention, and, therefore, I do not with to be understood as limiting myself to the exact form, construction, arrangement and combination of parts herein shown and described.

I claim:

1. In combination: a pole for fishing, a spinning reel having a frame, a post securing said frame to one side of said pole, a spool having a line connected thereto, a rotatable assembly comprising a drum and an extendible and retractable line control element mounted on said drum for movement with respect thereto, means for rotating said assembly to cause said element to direct the line onto said spool, means for shifting the assembly relative to the spool to a predetermined position to render said element inoperative to wind line onto the spool and thereby permit the line to freely unwind therefrom, reciprocable means for engaging and disengaging said element so the latter may be caused to stop or release the line from the spool when said assembly is in said position, and means substantially coextensive with said post and operatively connected to said reciprocable means and to other means carried by an opposite side of said pole for actuating said reciprocable means.

2. In combination: a pole for fishing, a spinning reel having a frame, a tubular post securing said frame to one side of said pole, a spool having a line connected thereto, a rotatable assembly comprising a drum and an extendible and retractable line control element mounted on said drum for movement with respect thereto, means for rotating said assembly to cause said element to direct the line onto said spool, means for shifting the assembly relative to the spool to a predetermined position to render said element inoperative to wind line onto the spool and thereby permit the line to freely unwind therefrom, reciprocable means for engaging and disengaging said element so the latter may be caused to stop or release the line from the spool when said assembly is in said position, means extending through said post and operatively connected to said reciprocable means for actuating the latter to control said element to stop or release the line from said spool and an actuator carried by an opposite side of said pole for operating said extending means.

3. In combination: a handle portion, a fishing reel secured to one side of said handle portion and comprising a frame, a spool mounted with respect to said frame, a driven shaft, means for driving said shaft, a line control assembly mounted on said shaft and comprising a drum and means movable thereon for engaging a line to direct the latter onto the spool, means whereby said control assembly may be shifted forwardly to a predetermined position, means for actuating said line engaging means when said control assembly is in said predetermined position, a cover for said control assembly, said cover having an annular wall surrounding said drum and a front wall provided with a large opening through which the line may flow, the diameter of said opening being not less than 80% to 100% of the diameter of said drum, and means mounted on an opposite side of said handle for operating said actuating means.

4. In combination: a fish pole having handle structure and a reel; said handle structure comprising a fore straight extension and a rear straight extension with an intermediate portion between said extensions; said intermediate portion being provided with an opening extending therethrough, said reel comprising a tubular post secured to said intermediate portion and spacing said reel laterally from said handle, a spool having an axis disposed substantially in parallel relation to the longitudinal axes of said fore and rear extensions, a unit comprising a member rotatable about the axis of the spool and a movable line engaging element carried by said member for directing a line onto the spool, and means extending through said post and opening for moving said unit to a predetermined position, said extending means also being operable to actuate said line engaging element when said unit is in said predetermined position, and means for driving the rotatable means.

5. A handle structure for supporting a fishing rod, said handle including a body provided with a longitudinally extending recess at its underside, a reel containing mechanism and having a post provided with a longitudinal opening and a plate carried by the post, means securing said plate in said recess, said body also being provided with a longitudinal chamber at its upper side and with an aperture, slidable means slidably extending through said opening in said post and having a lower end operatively connected with said mechanism and an upper end extending into said chamber through said aperture, and an elongate actuator having at least a portion thereof partially disposed in said chamber, said actuator having one end pivotally connected to said body and an abutment remote from said pivotal end for actuating said slidable means.

6. A handle structure for supporting a fishing rod, said handle comprising a center body, a forwardly extending portion provided with a grip and a socket for receiving a rod and a rearwardly extending portion provided with a grip, said body being provided with a longitudinally extending recess at its underside, a reel containing mechanism and having a post provided with a longitudinal opening and a plate carried by the post, means securing said plate in said recess, said body also being provided with a longitudinal chamber at its upper side and with an aperture, slidable means slidably extending through said opening in said post and having a lower end operatively connected with said mechanism and an upper end extending into said chamber through said aperture, and an elongate actuator having at least a portion thereof partially disposed in said chamber, said actuator having one end pivotally connected to said body and an abutment remote from said pivotal end for actuating said slidable means.

7. A unit comprising a handle provided with an opening extending transversely therethrough, a reel having a housing containing a mechanism provided with an internal movable component, means extending between said handle and said reel in general alignment with said opening for supporting said reel in spaced relation with reference to one side of said handle, elongate means extending substantially directly between said handle and reel and having one end connected to said component and an opposite extremity extending into said opening for external manual pressure operation at a location at an opposite side of said handle to effect movement of said elongate means to actuate said component of said mechanism.

8. The unit defined in claim 7, in which said first mentioned means is in the form of a tubular post and said elongate means is reciprocably mounted therein.

9. The unit defined in claim 7, including means mounted on said handle in relation to said opposite extremity of said elongate means for digital operation to actuate said elongate means.

10. A handle structure for supporting a fishing rod, said handle including a body provided with a longitudinally extending seat at its underside, a reel containing mechanism and having a post provided with a longitudinal opening and a plate carried by the post, means securing said plate on said seat, said body also being provided with a longitudinal chamber at its upper side and with an aperture, slidable means slidably extending through said opening in said post and having a lower end operatively connected with said mechanism and an upper end extending into said chamber through said aperture, and an elongate actuator having one end pivotally connected to said body and an abutment remote from said pivotal end for actuating said slidable means.

11. In combination: a rod provided with a handle and a plurality of longitudinally spaced line guiding eyes including an inner eye having a large diameter located in front of said handle, a reel mounted on the handle in laterally spaced relation thereto and facing said inner eye, said reel containing mechanism including a spool and an annular drumlike control assembly having a line engaging element for retrieving and releasing a line adapted for connection with the spool and for extension through said inner eye, means whereby said control assembly may be shifted forwardly to a predetermined position, means carried by said handle whereby said element may be manipulated when said control assembly is in said predetermined position, a cylindrical cover carried by said reel and disposed in concentric spaced relation to said control assembly and in front of said spool, and said cover being provided with an opening larger than said inner eye and smaller than the diameter of said control assembly located rearwardly of said inner eye, the spacing between the longitudinal axes of said rod and reel and the distance between said opening and inner eye affording an arrangement whereby the line may gyrate in a path having a diameter which is greater than the diameter of said opening at a location closer to said opening than to said inner eye.

12. In combination: an elongate handle for a pole, a fishing reel comprising a frame provided with a part securing the reel in laterally spaced relation to one side of said handle at a location intermediate its length, a line support, a driven shaft provided with an annular line control assembly for directing a line onto the support when connected thereto, a drive shaft operatively connected to said driven shaft and means for driving the drive shaft, means carried by an opposite side of said handle for shifting said driven shaft and line control assembly as a unit relative to said line support, a cover carried by said frame and having an annular portion disposed in concentric spaced relation to said control assembly and a line guide opening spaced axially and forwardly of said control assembly, said opening being of a relatively large diameter which is slightly less than the diametrical size of said control assembly so that a portion of the line extending between said control assembly and an edge of said opening approaches a straight condition generally parallel to the longitudinal axis of the reel.

13. In combination: a handle provided with means for supporting only at its fore end a fishing rod extending forwardly from said end, a post extending angularly with respect to the longitudinal axis of said handle and provided with a housing containing a reel mechanism, elongate means slidable in said post and having an end disposed in said housing for operating a component of said mechanism and an opposite end extending into said handle, and said handle being provided with an opening spaced rearwardly of said rod supporting means affording access to said opposite end of said elongate means whereby pressure can be applied to the latter to actuate said component.

14. In combination: a fish pole having a handle, rod and fishing reel, said handle being provided with an opening extending transversely therethrough, said reel comprising a housing structure provided with a mechanism therein and a post, means for attaching said post to said handle and spacing said reel from said handle, elongate shaft means extending lengthwise in said post and through said attaching means for reciprocation, said shaft means having one extremity operatively connected with a component of said mechanism and an opposite extremity disposed in said opening, and means adapted for digital operation mounted on said handle to actuate said shaft means for controlling said component.

15. In combination: a fish pole having a handle and a rod, said handle being provided with an opening in its upper side, a reel comprising a housing structure provided with mechanism therein, a post supportnig said housing structure in laterally spaced relation to said handle and provided with a longitudinal guideway generally aligned with said opening, elongate means reciprocably mounted in said guideway, said elongate means having an inner extremity operatively connected with a movable component of said mechanism and an outer extremity disposed in said opening for manipulation to actuate said elongate means for controlling the movement of said component.

16. In combination: a pole, a spinning reel carried by one side of said pole and comprising a frame and a tubular post extending therefrom, a spool mounted on said frame, an annular pickup assembly mounted for rotation and reciprocation provided with a movable element for directing a line onto said spool and preventing its release therefrom, a cover carried by said frame and provided with a line guide opening slightly less than the diameter of said pickup assembly, a movable member supported by said frame at the rear of said spool, means for operatively connecting said member and said pickup assembly in a manner whereby the latter can be shifted forwardly to a predetermined position relative to said spool, means whereby said pickup assembly can be temporarily detained in said position while permitting actuation of said member to control the operation of said element to prevent release of the line from said spool, a rod slidable in said post and having an inner end connected to said member and having an outer end extending free of said post for manipulation to effect movement of said member and means carried by an opposite side of said pole for applying pressure to said outer end of said rod.

17. In combination: a handle, a flexible rod extending axially from said handle, a plurality of line guiding eyes including an inner relatively large inner eye carried by and longitudinally spaced on said rod, a spinning reel carried by said handle and provided with a spool, a cover provided with a relatively large opening, a rotatable pickup disposed between said spool and cover and comprising a drum having a front wall provided with a line engaging element which is non-engageable with said spool for directing a line onto said spool when connected thereto and extended through said opening and said eyes, means engageable with said element and having a part extending into said handle for manipulating said element by external pressure when said element is in a predetermined position, drag means for imparting a drag action to said pickup when reversely rotated, the spacing and the relative sizes of said opening and said inner eye being such that that portion of the rod between said handle and said inner eye serves to control excessive angular deflection of the line with respect to the longitudinal axis of the reel to insure proper function of the drag means.

18. In combination: a handle, a flexible rod extending axially from said handle, a plurality of line guiding eyes including an inner relatively large inner eye carried by and longitudinally spaced on said rod, a spinning reel carried by one side of said handle and provided with a spool, a cover provided with an opening, a pickup assembly comprising a drum rotatable in one direction and having an annular wall provided with an aperture and a front wall carrying a line engaging element at the rear side for projection through said aperture for winding a line onto said spool when connected to said spool and extending through said opening and said eyes, means engageable with said element having a part extending to an opposite side of said handle for external operation when said element is in a predetermined position, drag means for imparting a drag action to said pickup assembly when reversely rotated, said opening having a minimum diameter of at least 80% of that of said drum and said inner eye, the spacing and the relative sizes of said opening and said inner eye being such that that portion of the rod between said handle and said inner eye serve jointly to control excessive angular deflection of the line with respect to the longitudinal axis of the reel to maintain drag operation.

19. In combination: a handle, a flexible rod extending axially from said handle; a plurality of line guiding eyes including a relatively large inner eye carried by and longitudinally spaced on said rod; a spinning reel carried by one side of said handle and provided with: a spool member, a drum member provided with a pivotal line engaging element for directing a line onto said spool and controlling its release therefrom and a front wall having an opening therein for receiving a line adapted for connection with said spool member and extending through said inner eye; means independent of said spool engageable with said element and having a part extending to an opposite side of said handle for controlling the operation of said element, drag means for imparting a drag action to one of said members in response to line pull against said element; the spacing of said drum member, inner eye and said opening being such that said inner eye in conjunction with said rod will maintain the line within a predetermined angular range of movement with respect to the longitudinal axis of the reel so that action of the drag will always respond to line pull.

20. In combination: a handle, a flexible rod extending axially from said handle, a plurality of line guiding eyes including a relatively large inner eye carried by and longitudinally spaced on said rod, a spinning reel carried by one side of said handle comprising a housing having a front wall provided with a relatively large opening facing said inner eye, a non-rotatable spool disposed in said housing, a rotatable drum disposed in said housing between said opening and said spool and provided with a pivotal line engaging element for directing a line onto said spool when connected to said spool and extended through said opening and said eyes, means engageable with said element and having a part extending to an opposite side of said handle for actuating said element when the latter is in a predetermined position, drag acting means for retarding reverse rotation of said drum when said element is subjected to line pull, said rod serving to control relative displacement between said inner eye and said opening to insure that said drag acting means will always be effective to control reverse rotation of said line pickup assembly when said rod is flexed.

21. A unit comprising a handle provided with an opening extending transversely therethrough, a flexible rod carried by and extending longitudinally thereof and provided with an inner relatively large eye, a reel having a housing containing a mechanism provided with an internal movable line engaging component, said housing including a cover provided with an aperture, said mechanism also including a spool and a rotatable drum carrying said component for directing line onto the spool, drag means for imparting a drag action to said drum when reversely rotated by the pull of line against said component, means extending between said handle and said reel in general alignment with said opening for supporting said reel in spaced relation with reference to one side of said handle, elongate means extending substantially directly between said handle and reel, means for operatively connecting one end of said elongate means and said component and said elongate means also having an opposite end extending into said opening for external manual pressure operation at a location at an opposite side of said handle to effect movement of said elongate means to actuate said component of said mechanism to a position responsive to line pull, the spacing and relative sizes of said aperture and said inner eye being such that that portion of the rod between said handle and inner eye serves to control excessive angular deflection of the line with respect to the longitudinal axis of the reel to insure correct functioning of the drag action.

22. In combination: a unit comprising a handle provided with an opening extending transversely therethrough, a flexible rod carried by said handle and provided with an inner relatively large eye, a spinning reel having a housing containing a mechanism provided with an internal movable line engaging component, said housing including a cover provided with an aperture and said mechanism including a spool and a rotatable drum carrying said component for directing a line onto said spool and controlling its release therefrom, means extending between said handle and said reel in general alignment with said opening for supporting said reel is spaced relation with reference to one side of said handle, elongate means extending substantially directly between said handle and reel and having one end for operating said component and an opposite extremity extending into said opening for external manual pressure operation at a location at an opposite side of said handle to effect movement of said elongate means to actuate said component of said mechanism to a position responsive to line pull, said aperture having a diameter of at least 80% of that of said drum, the spacing and relative sizes of said aperture and said inner eye being such that that portion of the rod between said handle and said inner eye serves jointly to control excessive angular deflection of the line with respect to the longitudinal axis of the reel to maintain drag operation.

23. In combination: a unit comprising a handle provided with an opening extending transversely therethrough, a flexible rod carried by said handle and provided with a plurality of line guiding eyes including a relatively large inner eye, a reel having a housing containing a mechanism provided with an internal movable line engaging component, said housing including a cover provided with an aperture and said mechanism including a spool element and a drum element carrying said component for directing a line under the spool and controlling its release therefrom, means extending between said handle and said reel in general alignment with said opening for supporting said reel in spaced relation with reference to one side of said handle, elongate means extending substantially directly between said handle and reel and having one end for operating said component and an opposite extremity extending in said opening for external manual pressure operation at a location at an opposite side of said handle to effect movement of said elongate means to actuate said component of said mechanism to a position responsive to line pull, the spacing of said drum element, inner eye and aperture being such that said inner eye in conjunction with said rod will maintain the line within a predetermined angular range of movement with respect to the longitudinal axis of said reel so that action of the drag will always respond to line pull.

24. In combination: a unit comprising a handle provided with an opening extending transversely therethrough, a flexible rod carried by said handle and provided with a plurality of line guiding eyes including a relatively large inner eye, a spinning reel having a housing containing a mechanism provided with an internal movable line engaging component, said housing having a front wall provided with a line guiding aperture spaced from said inner eye and said mechanism including a non-rotatable spool and a rotatable drum carrying said component interposed between said spool and said aperture, said component serving to direct a line onto said spool and control its release therefrom, drag acting means for retarding reverse rotation of said drum, means extending between said handle and said reel in general alignment with said opening for supporting said reel in spaced relation to one side of said handle, elongate means extending substantially directly between said handle and reel and having one end for actuating said component and an opposite extremity extending into said opening for external manual pressure operation at a location at an opposite side of said handle to effect movement of said elongate means to actuate said component of said mechanism to a position responsive to line pull, the relative diameters of said aperture and said drum and the relationship between said aperture, said inner eye and said rod being such that said drag acting means will always be active to retard reverse rotation of said drum and component carried thereby when the latter is subjected to line pull.

25. A unit comprising a handle and a flexible rod carried by and extending longitudinally thereof and provided with a plurality of eyes including a relatively large inner eye, a reel having a housing containing a mechanism provided with an internal movable line engaging component, said housing including a cover provided with an aperture, said mechanism including a spool and a rotatable drum carrying said component for directing a line onto said spool and controlling its release therefrom, drag means for imparting a drag action to said drum when reversely rotated by the pull of a line against said component, means extending between said handle and said reel for supporting said reel in spaced relation with reference to one side of said handle, elongate means extending between said handle and said reel and having one end for actuating said component and an opposite extremity extended for external manual pressure operation at a location at an opposite side of said handle to effect movement of said elongate means to actuate said component of said mechanism to a position responsive to line pull, the relative diameters and spacing of said aperture, drum and inner eye being such that that portion of the rod between said handle and said inner eye serves to control excessive angular deflection of the line with respect to the longitudinal axis of the reel whereby to insure correct functioning of the drag action.

References Cited by the Examiner

UNITED STATES PATENTS

| | | | |
|---|---|---|---|
| 2,283,039 | 5/1942 | Bremiller | 43—20 X |
| 2,711,292 | 6/1955 | Taggart et al. | 43—22 X |
| 2,736,979 | 3/1956 | Le Gal | 43—20 |
| 2,837,858 | 6/1958 | Benson | 43—22 |
| 2,882,637 | 4/1959 | Tuttle | 43—20 |
| 2,929,579 | 3/1960 | Hull | 43—22 X |
| 3,052,424 | 9/1962 | Skraban | 43—21 X |
| 3,062,474 | 11/1962 | Clark | 242—84.2 |
| 3,074,664 | 1/1963 | Beger | 242—84.2 |
| 3,152,771 | 10/1964 | Maury et al. | 242—84.2 |

FOREIGN PATENTS

| | | |
|---|---|---|
| 1,215,596 | 11/1959 | France. |
| 957,611 | 2/1957 | Germany. |

ABRAHAM G. STONE, *Primary Examiner.*